(12) United States Patent
Dieterich

(10) Patent No.: US 9,969,027 B2
(45) Date of Patent: May 15, 2018

(54) ROLLER HEAD FOR A RESISTANCE WELDING MACHINE

(71) Applicant: Soudronic AG, Bergdietikon (CH)

(72) Inventor: Daniel Dieterich, Hittnau (CH)

(73) Assignee: Soundronic AG, Bergdietikon (CH)

( * ) Notice: Subject to any disclaimer, the term of this patent is extended or adjusted under 35 U.S.C. 154(b) by 715 days.

(21) Appl. No.: 14/398,277

(22) PCT Filed: Jun. 28, 2013

(86) PCT No.: PCT/CH2013/000090
§ 371 (c)(1),
(2) Date: Oct. 31, 2014

(87) PCT Pub. No.: WO2013/181765
PCT Pub. Date: Dec. 12, 2013

(65) Prior Publication Data
US 2015/0129561 A1    May 14, 2015

(30) Foreign Application Priority Data

Jun. 4, 2012    (CH) .......................................... 769/12

(51) Int. Cl.
*B23K 11/30*    (2006.01)
*B23K 11/087*   (2006.01)
*B23K 101/12*   (2006.01)

(52) U.S. Cl.
CPC ...... *B23K 11/3045* (2013.01); *B23K 11/0873* (2013.01); *B23K 11/0876* (2013.01); *B23K 2201/125* (2013.01)

(58) Field of Classification Search
CPC ............ B23K 11/3036; B23K 11/3045; B23K 37/003

USPC .............................................. 219/84, 81, 64
See application file for complete search history.

(56) References Cited

U.S. PATENT DOCUMENTS

| 2,407,676 A | * | 9/1946 | Munson | B23K 11/3045 219/84 |
| 2,643,318 A | * | 6/1953 | Williams | B23K 11/3045 219/84 |
| 3,501,611 A | * | 3/1970 | Opprecht | B23K 11/3036 219/84 |
| 3,546,655 A | * | 12/1970 | Prendergast | B23K 11/3045 439/10 |
| 4,188,523 A | * | 2/1980 | Kawai | B23K 11/3045 219/71 |

(Continued)

FOREIGN PATENT DOCUMENTS

| DE | 4020182 C1 | 8/1991 | |
| DE | 4210974 A1 | * 10/1993 | ......... B23K 11/3045 |

OTHER PUBLICATIONS

International search report for PCT/CH2013/000090 dated Aug. 30, 2013.

*Primary Examiner* — Dana Ross
*Assistant Examiner* — Lawrence Samuels
(74) *Attorney, Agent, or Firm* — McCormick, Paulding & Huber LLP

(57) ABSTRACT

With a roller head (10) of a resistance seam welding machine, which roller head has a stator (12) and a rotor (14), the bearing outer housing (18, 18') is cooled by means of channels (2, 2') provided in its interior. This increases the life of the roller head.

7 Claims, 3 Drawing Sheets

(56) References Cited

U.S. PATENT DOCUMENTS

| | | | | |
|---|---|---|---|---|
| 4,433,229 A | * | 2/1984 | Morikawa | B23K 11/3036 219/119 |
| 5,155,405 A | * | 10/1992 | D'Aniello | B23K 11/366 219/81 |
| 5,159,168 A | * | 10/1992 | Portmann | B23K 11/3045 219/81 |
| 5,420,389 A | * | 5/1995 | Davies | B23K 11/063 219/64 |
| 6,812,427 B2 | * | 11/2004 | Sgrignuoli | B23K 11/3045 219/81 |
| 2002/0195430 A1 | * | 12/2002 | Sgrignuoli | B23K 11/3045 219/81 |

* cited by examiner

Prior Art

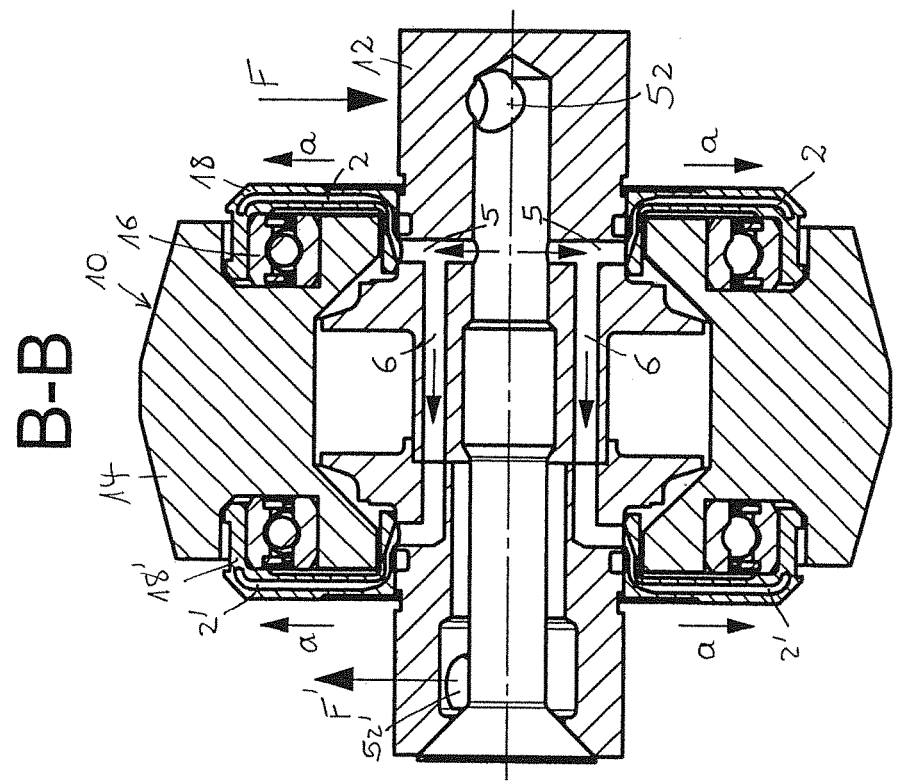
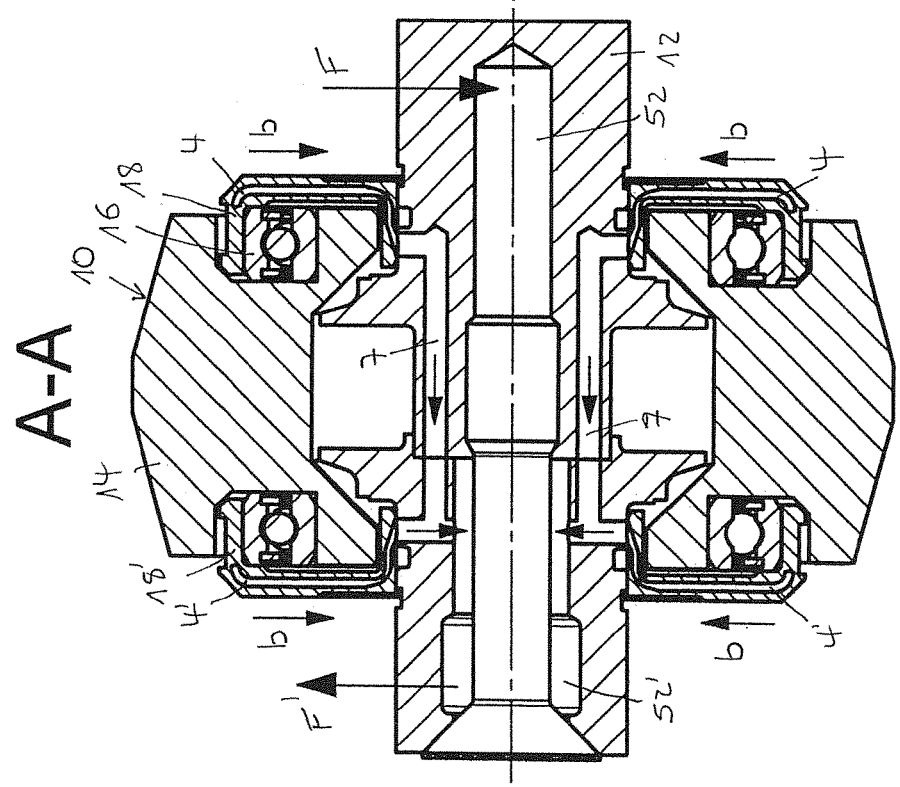

ROLLER HEAD FOR A RESISTANCE WELDING MACHINE

CROSS REFERENCE TO RELATED APPLICATIONS

This application is entitled to the benefit of and incorporates by references subject matter disclosed in International Patent Application No. PCT/CH2013/000090, filed on May 28, 2013 and Swiss Patent Application No. 769/12 filed on Jun. 4, 2012.

TECHNICAL FIELD

The invention relates to a roller head for a resistance seam welding machine. Further, the invention relates to a resistance seam welding machine and a method for resistance seam welding with roller heads of this kind.

PRIOR ART

A roller head of the kind mentioned in the introduction is disclosed in DE-A-40 20 182 C1. Such roller heads have proved their worth. The service life of the roller heads in operation is substantially determined by the roller bearings between rotor and stator. These bearings are cooled from the inside of the roller head by the coolant circulating within the roller head which dissipates heat from the bearing via the bearing inner housing. The lubricant present in the bearing ages due to the operating temperatures when welding. With increasing welding speed and the necessary higher welding frequency, the requirements increase, which necessitates improved lubricants. A resistance welding machine is known from DE-A-42 10 974 which is provided with electrode rollers arranged side by side and in which the roller bearings are directly contacted by the coolant while the electrical sliding contacts are not directly cooled by the coolant. This construction and arrangement of the electrode rollers is not suitable for the welding of container bodies which necessitates that one of the roller heads is working inside of the body and the other roller head outside of the body.

SUMMARY OF THE INVENTION

The invention is based on the object of creating an improved roller head. In particular, this must have an increased service life.

With the roller head of the kind mentioned in the introduction, this is achieved in that further coolant channels which are in fluid connection with channels in the stator are provided in the interior of the bearing outer housing.

The double-sided cooling of the bearings which is thereby achieved enables a reduced bearing temperature to be achieved. External cooling has previously not been considered by the person skilled in the art for roller heads of this kind which are used for welding can bodies. It appears, however, that this measure offers considerable advantages and is superior to forcing the pure internal cooling and/or the use of high-quality lubricants.

It is preferred that the arrangement of the coolant channels in the interior of the bearing outer housing comprises a plurality of coolant channels which radiate outwards from the centre of the bearing outer housing. Preferably, these radial channels lead to a ring-shaped coolant channel in the interior of the bearing outer housing which is located remotely from the centre of the bearing outer housing in the region of the outer edge of the bearing outer housing. This results in good cooling while the bearing outer housing is easy to manufacture. In particular, four or more outwards radiating coolant channels are provided.

Further, the invention relates to a resistance seam welding machine having a top roller head arranged on a top arm of the machine and a bottom roller head arranged on a bottom arm of the machine, between which roller heads the resistance seam welding machine forms the path for the passage of the weld metal. Such resistance seam welding machines are known and used particularly for welding can bodies. In doing so, high welding speeds are encountered.

The advantages mentioned above are achieved in that the top and the bottom roller head is a roller head with coolant channels in the interior of the bearing outer housings.

Further, the invention relates to a method for resistance seam welding the longitudinal seam of can bodies by means of two roller heads, between which the can bodies are conveyed.

The advantages explained are achieved in that the bearing outer housings of the roller heads are cooled by means of a cooling liquid which circulates in the interior of the bearing outer housings.

BRIEF DESCRIPTION OF THE DRAWINGS

An apparatus and the procedure according to the prior art and exemplary embodiments of the invention are described in more detail below based on the drawings. In the drawings

FIG. 3 shows a simplified section through a roller head according to the invention along the section line B-B of FIG. 2;

FIG. 4 shows a simplified section through a roller head according to the invention along the section line A-A of FIGS. 2.

DESCRIPTION OF PREFERRED EMBODIMENTS

Figure 1:
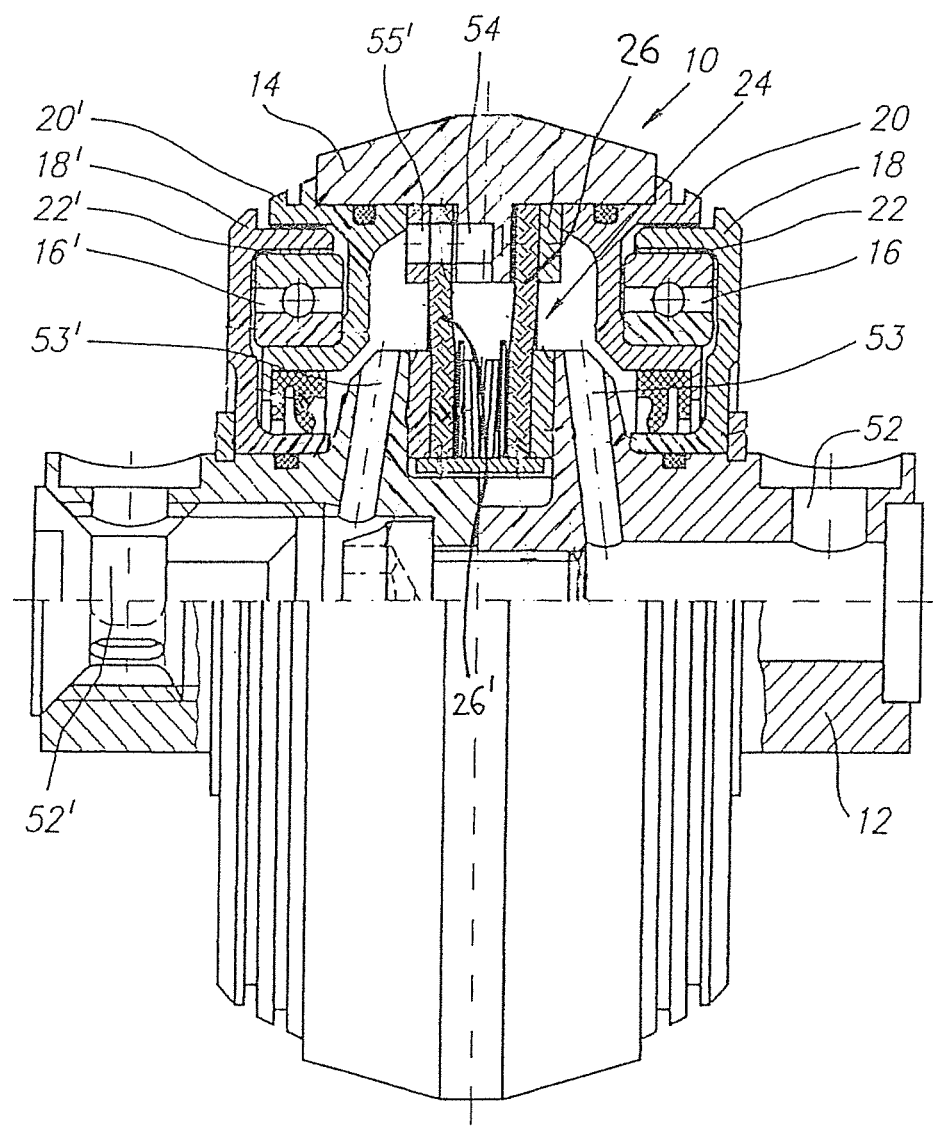
FIG. 1 shows a roller head according to the prior art in order to explain its design.

The design of a roller head according to the prior art, in particular in accordance with DE 40 20 182 C1 is explained with reference to FIG. 1. FIG. 1 shows the roller head designated overall by 10 for a resistance welding machine for resistance roller seam welding of can bodies. The roller head 10 is shown in section above its axis of rotation and, in this example, has a stator 12 in the form of a two-part axis on which a rotor 14 is rotatably mounted by means of roller bearings 16, 16'. The same references but with a dash in each case designate the other part of a pair of identically designed parts. For mounting by means of the roller bearings, the roller head 10 has bearing outer housings 18, 18' fixed to the stator 12 and bearing inner housings 20, 20' fixed to the rotor 14, between which are arranged the roller bearings 16, 16' (here shown as ball bearings). The bearing outer and bearing inner housings 18, 18' and 20, 20' respectively are made from non-rusting, anti-magnetic steel and therefore have low eddy current losses. The roller bearing outer rings are in each case electrically separated by an insulation 22, 22' from the bearing outer housings 18 and 18' respectively. Instead, or in addition, the roller bearing inner rings can also be separated from the bearing inner housings 20, 20' by an electrical insulation.

The stator 12 is securely clamped with good electrical conductivity to the free end of a welding arm (not shown) of a resistance seam welding machine, wherein a bottom arm with a roller head and a top arm with a roller head, between which roller heads the welding takes place, as a rule using a wire intermediate electrode which is known to the person skilled in the art and is not explained further here, are provided for welding can bodies. The welding current is to be transmitted from the stator 12 to the rotor 14, which transmits it, preferably via the said wire electrode, to the welding point. A sliding contact current transmission device, which is designated overall by 24, as is disclosed in particular in DE 40 20 182 C1 to which reference is made here, is provided for transmitting current between stator and rotor.

Furthermore, according to the prior art, the internal space between the stator 12 and the rotor 14 is sealed fluid-tight by means of O-rings and shaft seals in the manner shown in FIG. 1. As the rotor 14 and the sliding contact surfaces have to be cooled, channels 52, 52' and 53, 53' in the stator 12, channels 54 in the rotor 14 and channels 55' in the sliding contact disc 26' are provided for feeding a liquid coolant through the roller head 10 (channels which are provided in the disc 26 and which correspond to the channels 55' are not visible in FIG. 1). In operation of the resistance welding machine, coolant is fed via the top and bottom arm respectively of the machine into the channel 52 and flows through the channel 53, through the not visible channels of the disc 26, through the channels 54 and 55' and finally through the channels 53' and 52' back into the top and bottom arm.

According to the present invention, the bearing outer housings 18 and 18' are also cooled by the coolant which enters the roller head through the channel 52 in the stator and leaves it again through the channel 52' in the stator. For this purpose, coolant channels are arranged in the interior of the bearing outer housings 18 and 18', which will now be explained in more detail with reference to FIGS. 2, 3 and 4 by means of a preferred example. In this example, the roller head 10 is partially shown in a simplified manner compared with FIG. 1. The same references as in FIG. 1 designate the same or at least functionally identical elements of the roller head.

Figure 2:
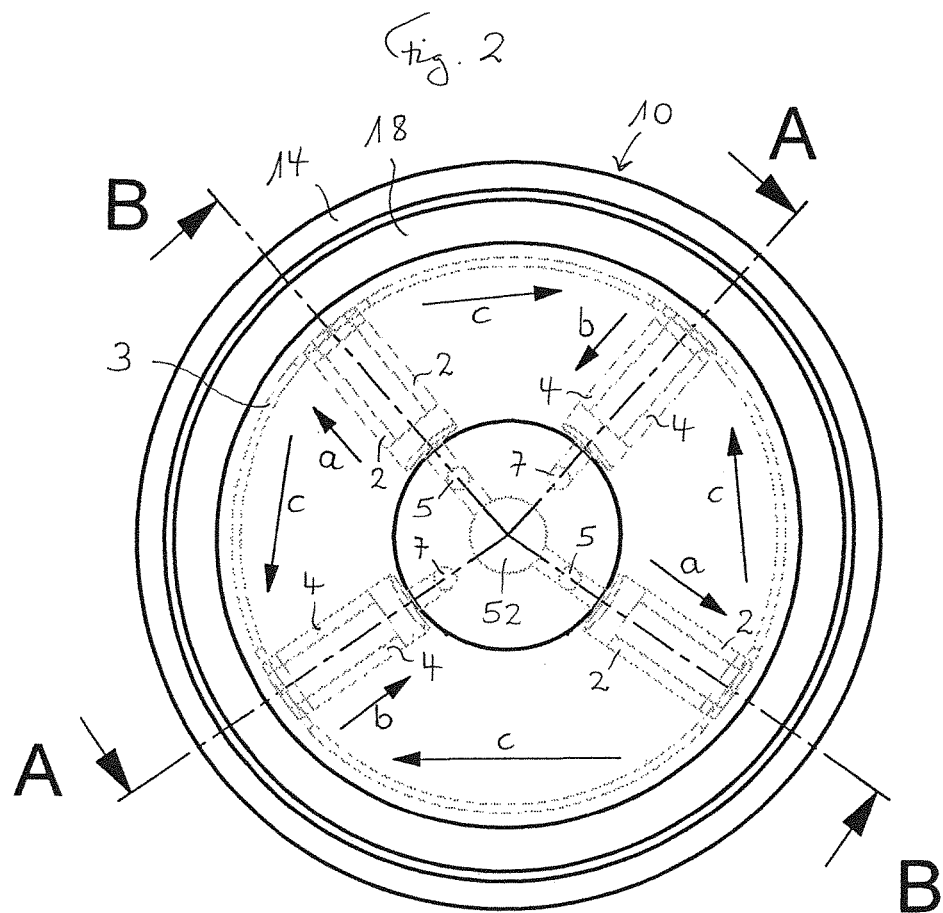
FIG. 2 shows a side view on the bearing outer housing of a roller head according to the invention showing the coolant channels which are provided in the bearing outer housing.

FIG. 2 shows a view on a roller head 10 from the side, thus resulting in a plan view on the bearing outer housing 18. The channels for the cooling liquid in the interior of the bearing outer housing 18, which cannot be seen from the outside, and channels in the stator 12, which also cannot be seen from the outside, are indicated by broken lines. FIG. 3 shows a sectional view along the section line B-B of FIG. 2, and FIG. 4 shows the sectional view along the section line A-A of FIG. 2. The entry of cooling liquid into the channel 52 of the stator 12 is shown by the arrow F in FIG. 3. As mentioned, this cooling liquid is pumped through the welding arm of the welding machine to which the roller head is securely clamped. This is known and is not explained further here. The discharge of the cooling liquid which leaves the roller head via the channel 52', which is symbolized by the arrow F', is also not explained further. In the stator 12, the cooling liquid passes through the channels 5 to enter the channels 2 of the bearing outer housing 18. Further, through the channels 6 branching off from the channels 5 to enter the channels 2' of the bearing outer housing 18'. The channels 52 and 54 in the stator 12 are—as in FIG. 1—sealed fluid-tight with respect to one another. This results in the flow of cooling liquid shown by means of the arrows in FIG. 2 and in FIG. 3 from the stator 12 into the bearing outer housings 18 and 18' and, in the bearing outer housing itself, the flow through the channels 2 outwards from the centre to the outer edge of the bearing outer housing, as shown for the bearing outer housing 18 by means of the arrows a in FIG. 2 and in FIG. 3, and for the bearing outer housing 18' by means of the arrows a' in FIG. 3. A preferably ring-shaped channel 3, which can only be seen in FIG. 2, is provided in the bearing outer housing 18 (and also in the bearing outer housing 18') and is arranged at a distance from the centre 7 of the bearing outer housing and is fed from the channels 2 and 2'. The cooling liquid flows back from this channel 3 (arrow c) to the outlet 52' in the stator. In addition, the cooling liquid next flows through the channels 4 and 4' in the bearing outer housings 18 and 18' (arrow b) to the centre of each bearing outer housing. The section along the section line A-A of FIG. 2 and FIG. 4 shows this. Channels 7 in the stator 12 feed the cooling liquid from the centre of the bearing outer housings 18, 18' into the channel 52' in the stator. From there, the cooling liquid is discharged via the welding arm, which is known and is not explained further here.

The bearing outer housings 18, 18' with the channels arranged therein can be produced in various ways. A preferred method of production is a layer-by-layer construction from a metallic powder material by means of laser sintering, which is known under the technical term "generative metal forming (GMF)". Layers (of e.g. 20 micrometers thickness) are built up successively in a relief-like manner by means of the laser, as a result of which the channel structure shown or a different channel structure can be provided in the bearing outer housing as it is built up. It is also possible to construct the bearing outer housing from a plurality of separately cut layers of a metal material which are bonded together when placed on top of one another. The at least one middle layer with its cutouts then forms the channels. Such a layer can be cut with a laser cutting tool or by means of spark erosion for example. The layers can be joined over their surface area and at the edges by welding (e.g. friction welding and electron beam welding).

Figure 5:
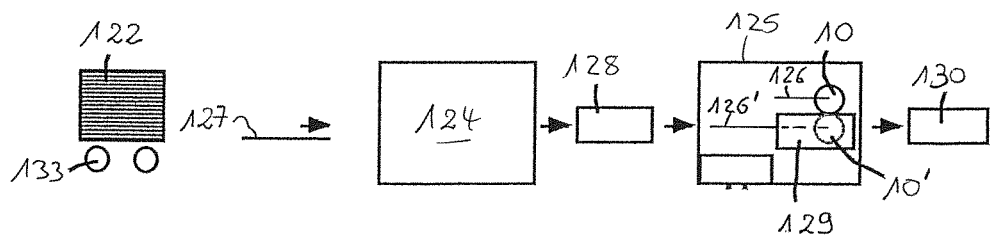
FIG. 5 shows highly schematically the procedure and a resistance seam welding apparatus for welding can bodies with roller heads according to the invention.

FIG. 5 shows highly schematically a resistance seam welding machine 125 by means of which can bodies 128, 129, 130 are welded. This is basically familiar to the person skilled in the art and is only explained briefly here. Individual sheets are unloaded from a stack 122, which is arranged on a transport car 133 for example, and fed to a rounding device 124. The sheet 127 is shown in the figure by way of example. In the rounding device 124, the sheet is rounded and leaves the rounding device in the form of can body 128, the longitudinal overlapping seam of which is still open and is to be subsequently welded in the resistance seam welding machine 125. The roller heads 10 and 10', which are roller heads according to the invention with cooled bearing outer housing, are provided for this purpose. Here, the top roller head 10 is fixed to the merely implied top arm 126 of the welding machine 125, and the bottom roller head 10' to the merely implied bottom welding arm 126'. In a known manner, each roller head is supplied with cooling liquid via these welding arms and the heated cooling liquid is discharged via the welding arm. The body 129 is welded by means of the roller heads (as a rule using a wire intermediate electrode as is usual when welding can bodies). The previously welded can body is designated by 130.

The invention claimed is:

1. A roller head for a resistance seam welding machine having a stator with an electrode roller which is rotatably mounted on the stator as a rotor, for which purpose bearing inner housings connected to the rotor and bearing outer housings connected to the stator are provided, having a sliding contact current transmission device which is arranged between stator and rotor, and having channels for feeding a coolant through the stator and rotor to the bearing inner housings, characterized in that further coolant channels which are in fluid connection with channels in the stator are provided in the interior of the bearing outer housings, and radiate outwards from the centre of each bearing outer housing.

2. The roller head as claimed in claim 1, characterized in that the cooling channels in the interior of the bearing outer housings each comprise a ring-shaped coolant channel in the interior of the bearing outer housing which runs in the outer edge region of each bearing outer housing and into which the outwards radiating coolant channels open out.

3. The roller head as claimed in claim 1, characterized in that four or more outwards radiating coolant channels are provided.

4. The roller head as claimed in claim 1 characterized in that radial channels are provided within the stator which are connected to the coolant entry channel of the stator and with the coolant channels of one of the bearing outer housings, and that axial channels are provided within the stator that branch off from the radial channels (5) and are connected with the coolant channels of another of the bearing outer housings (18'), and in that further axial channels are provided within the stator which are connected with the coolant exit of the stator and with further coolant channels of both bearing outer housings.

5. The roller head as claimed in claims claim 1 characterized in that the sliding contact currant transmission device includes sliding discs with coolant channels.

6. A resistance seam welding machine having a top roller head arranged on a top arm and a bottom roller head arranged on a bottom arm of the machine, between which rover heads the weld metal passes, characterized in that the top and the bottom roller head is a roller head as claimed in claim 1.

7. A method for resistance seam welding the longitudinal seam of can bodies by means of two roller heads as claimed in claim 1, between which the can bodes are conveyed, characterized in that the bearing outer housings of the roller heads are cooled by means of a cooling liquid which circulates in the interior of the bearing outer housings.

\* \* \* \* \*

UNITED STATES PATENT AND TRADEMARK OFFICE
CERTIFICATE OF CORRECTION

PATENT NO.        : 9,969,027 B2
APPLICATION NO.   : 14/398277
DATED             : May 15, 2018
INVENTOR(S)       : Daniel Dieterich It is certified that error appears in the above-identified patent and that said Letters Patent is hereby corrected as shown below:

In Claim 5, Column 6, Line 7, after the word in, please delete "claims".

In Claim 7, Column 6, Line 19, please delete "bodes" and insert --bodies--.

Signed and Sealed this
Seventeenth Day of July, 2018

Andrei Iancu
*Director of the United States Patent and Trademark Office*